June 23, 1953     G. F. KINGMAN     2,642,919
BONDING DEVICE AND METHOD
Filed March 20, 1952     2 Sheets-Sheet 2
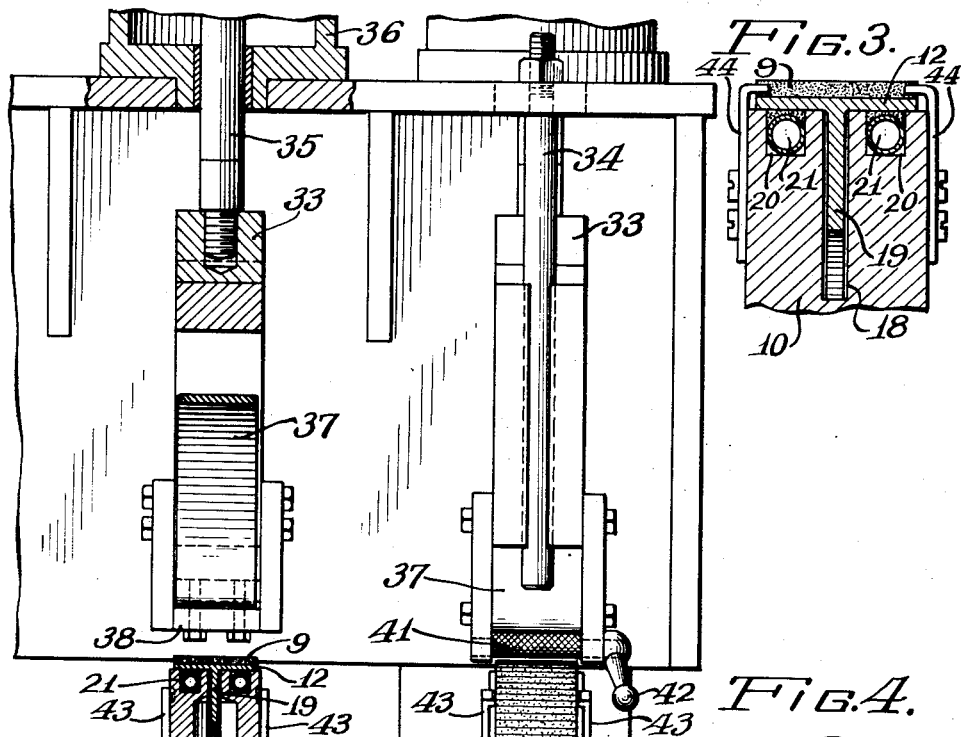
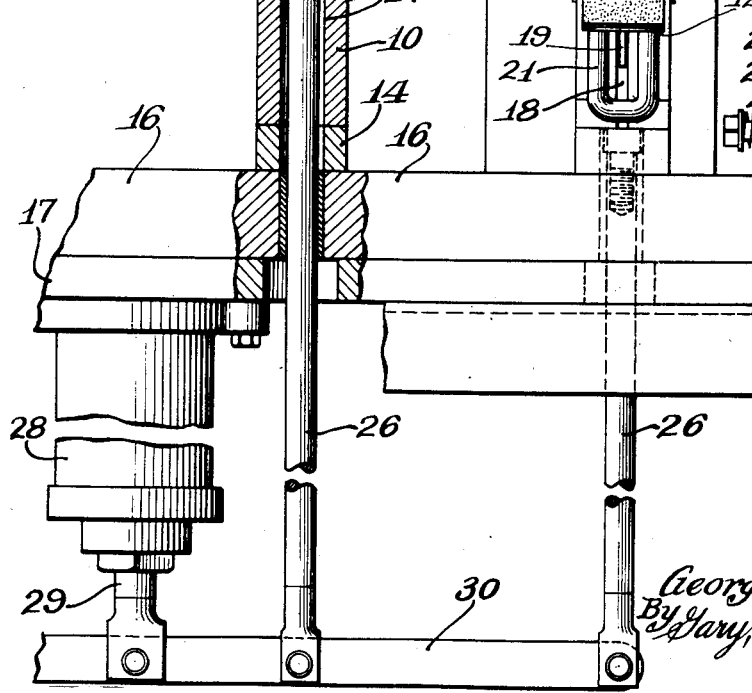
Inventor:
George F. Kingman
By Gary, Desmond & Parker
Attys.

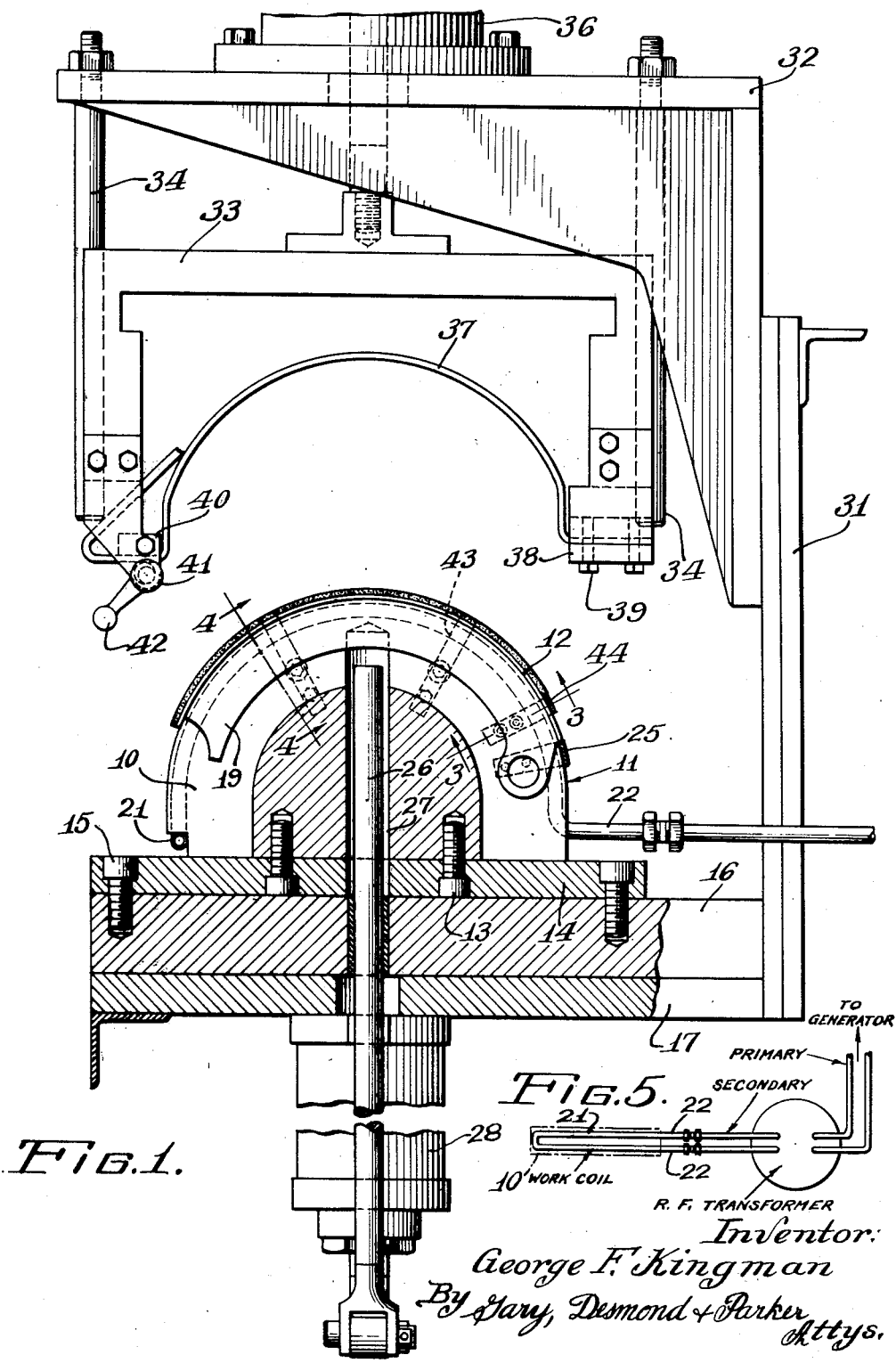

Patented June 23, 1953

2,642,919

UNITED STATES PATENT OFFICE 2,642,919

BONDING DEVICE AND METHOD

George F. Kingman, Bridgeport, Conn., assignor to Raybestos-Manhattan, Inc., Passaic, N. J., a corporation of New Jersey Application March 20, 1952, Serial No. 277,694

7 Claims. (Cl. 154—1)

This invention relates to a novel bonding device and method for adhesively uniting brake linings to brake shoes.

The device of the present invention is characterized by the employment of radio frequency induction heating, such as on the order of 400 kilocycles, which enables the desired operation to be quickly and effectively carried out and the heat localized to the component to be heated, that is the rim of the brake shoe, which conducts the heat to the layer of heat hardenable adhesive interposed between the rim and the brake lining.

Thus, for example, in the adhesive bonding of a brake shoe lining of conventional asbestos-containing friction material composition, such as is employed for automotive devices, to a ferrous metal brake shoe by means of a binder such as for example a thermosetting phenolic resin, the brake shoe can be rapidly brought up to a temperature of about 400° F., providing the bonding surface with a temperature of about 325-350° F. and to effect binder cure and firm bonding in about 4 to 5 seconds, with a complete handling cycle, that is, loading, curing and unloading, requiring only about 30 seconds.

The device of the present invention is further characterized by novel means for conducting the bonding operation under pressure, for obtaining substantially equal and uniform pressure over the arc of bonding and to compensate for irregularities in the mating surfaces; and for aligning the components to be bonded.

Other objects and advantages, together with arrangement of parts and details of construction and operation, will be apparent from a consideration of the following specification and drawings, wherein:

Fig. 1 is a fragmentary side elevational view of the device of the present invention, with parts broken away.

Fig. 2 is a fragmentary front elevational view of the device of the present invention, with parts broken away.

Fig. 3 is a sectional detail on the line 3—3 of Fig. 1.

Fig. 4 is a sectional detail on the line 4—4 of Fig. 1, further illustrating the pressure head of the device lowered to bonding position.

Fig. 5 is a wiring diagram.

Referring to the drawings, it will be noted from Fig. 2 that the device of the present invention may be adapted to carry out a multiple operation; that is, it may, and preferably for reasons of economy, should be constructed so as to permit a plurality of units to be bonded at one time or loading, although it will be understood that if desired the device may be constructed to handle a single unit. Thus the fragmentary view of Fig. 2 shows one half of a device which has four stations.

The device comprises the support or lower press component 10 having an outer convex or arcuate face 11 adapted to seat the rim or flanges of a brake shoe 12. The arcuate surface of the support 10 conforms to the arc of the brake shoe being handled, and when a brake shoe of different arc is to be handled, a support of suitable arc may be engaged in position by means of the bolts 13 connecting the support 10 to the plate 14, and the bolts 15 connecting the plate 14 to the bed 16 carried on the base 17.

The convex face of the member 10 is formed with a medial narrow groove or slot 18 sufficiently deep for snugly receiving the rib 19 of the brake shoe 12. The member 10 is further formed with a pair of spaced, upwardly opening slots or grooves 20, one on each side of the slot 18, which receive and seat and hold spaced the parallel, arcuately bent components of the tubular copper induction heating element or work coil 21, the components being connected by a U bend adjacent one end of arcuate face of support 10, and being connected at their other ends 22 to a suitable source of energy diagrammatically shown in Fig. 5.

The supporting element 10 is formed of a suitable nonconducting insulating material, for example, an asbestos fiber-resin composition. In the alternative, it may be composed of four boards suitably connected and held spaced to provide the medial slot or groove 18 and the two outer slots or grooves 20. The outer ends of the grooves 20 seating the element 21 may be closed by means of a suitable insulating cement as at 24 covering and protecting the work coil; or, in the alternative, the coil may be wrapped by insulating means such as glass or asbestos fabric.

In operation, a brake shoe is placed on the support 10 and seated thereon by inserting its rib 19 in the closely fitting slot 18, and longitudinally aligned thereon by means of the stop 25 extending over the surface 11, to form an abutment for one transverse edge of the rim of shoe 12.

The brake shoe in the subsequently described bonding operation can be dislodged from the support 10, when necessary, such as after completion of the bonding operation, by means of the reciprocable plunger 26 which extends through the radial slot 27 in the support 10 and its base components 14, 16 and 17. When a device is employed having a plurality of stations, and consequently a plurality of plungers 26, they are jointly actuated by means of a common air cylinder 28 whose piston 29 and plungers 26 are pivotally connected to the equalizing bar 30. Thus when the air cylinder 28 is actuated, the plungers 26 are caused to rise and act against the brake-shoe ribs 19 to thereby elevate the shoe from the support 10 and to permit the shoe to be readily lifted and removed.

For the purpose of carrying out the bonding operation, it is essential that it be carried out under pressure, since otherwise no effective bond results. Further, the pressure should be substantially equal and uniform over the entire arc of the area being bonded. For the purpose of accomplishing same, means are provided by the present invention as follows: A standard 31 rising from the members 16, 17 carries a head frame 32 which in turn supports one or more heads 33 in vertically slidable engagement with the bars 34. Each head 33 is adapted for vertical reciprocation by being secured to the piston 35 of an air cylinder 36 mounted above the head frame 32. In this case each head 33 is provided with an individual air cylinder so that positive and uniform pressure may be obtained at each station, although a plurality of cylinders may be actuated jointly, by conventional means, not shown.

Each head 33 carries an adjustably mounted flexible upper press component 37, the effective length of which may be changed to conform to the arc of the brake shoe being handled, and to complement the arc of the lower press member 10. This component 37 is in the form of a band, belt or strip having a width at least equal to that of the brake lining 9 to be bonded to the brake shoe, and may be composed of a strong material such as rubberized woven fabric. One end is securely anchored to the base of one vertical component of head 33 by means of the block 38 and bolts 39. The opposed free end of component 37 is inserted between the block 40 and the knurled eccentric clamp 41 pivotally mounted at the base of the opposed vertical component of head 33, and is adapted to be clamped in place by manipulating crank arm 42 at a suitable length adapted to conform to the arc of the lower press component 10. The adjustable and flexible nature of component 37 permits better equalizing and distributing the pressure between the upper and lower press components, and serves to compensate for irregularities and inequalities between the opposed surfaces of the rim of the brake shoe 12 and lining 9 to be bonded thereto, and particularly those of the brake lining surface.

In the bonding operation, brake-shoe assemblies each composed of a brake shoe 12, a lining 9 and an interposed layer of organic heat hardenable adhesive, are seated on the lower press members 10, as previously described, and the lining 9 aligned and centered on the face of the brake shoe 12, by means of the spring pressed fingers 43 acting against the side edges of lining 9, and the fingers 44 which form an end abutment for the lining. The air cylinders 36 are then actuated to clamp the upper press members against the linings 9 with a total force over the entire area of approximately 200 pounds. Energy is then supplied to the work coil 21 at a frequency of about 400 kilocycles, and induced therefrom to the ferrous metal brake shoe 12 which heats up to a temperature of about 400° F. in about 4–5 seconds, which is adequate to rapidly heat the binder to a hardening or curing temperature of about 350° F. and to bond the nonconducting brake lining material to the brake shoe, actual bonding being accomplished in the indicated 4–5-second period. Thereafter air cylinders 36 are actuated to lift the upper press member, and air cylinder 28 is actuated to elevate the rods 27 and to raise the brake-shoe assembly from the lower support 10, a complete operating cycle requiring only about 30 seconds.

Bonds accomplished by means of the present invention resist application of 100 pounds' pressure, even though the normal test is 50 pounds. This is further distinguished from bonds employing the same adhesive or binder accomplished by other known means such as infra-red or other heating means which would debond at 100 pounds' pressure.

The bonding adhesives are those conventionally employed in the art, such as for example the phenolic resins including phenol, urea or melamine formaldehyde, either alone or in combination natural or synthetic rubbers, to give a firm, tough bond. Further, these adhesives may be applied by directly coating the lining or shoe, or by interposition of a network or tie-ply impregnated with such binder in heat-curable condition.

I claim as my invention:

1. A device for bonding a friction material composition lining to an arcuate ferrous metal automotive brake shoe by means of an interposed layer of heat hardenable organic adhesive, comprising a support for said brake shoe of nonconducting material and formed with a convex surface for seating the rim of said brake shoe and substantially conforming to the arc thereof, an arcuately shaped induction heating work coil disposed within slots formed in said support and closely adjacent to the convex face thereof and adapted to induce heat in said metallic shoe, and means for retaining the brake lining on the outer face of the rim of the brake shoe under pressure during the heating operation.

2. The method of bonding a friction material composition lining to the rim of an arcuate ferrous metal automotive brake shoe by means of an interposed layer of heat hardenable organic adhesive, which comprises inductively heating said brake shoe to a temperature of about 400° F. by subjecting it to eddy currents from an induction heating work coil disposed in close proximity to the underface of the rim of the brake shoe and to thereby heat said layer of adhesive by conduction of heat from the resulting heated shoe and simultaneously retaining the brake lining on the outer face of the rim of the brake shoe under substantially uniformly distributed pressure during the heating operation.

3. A device for bonding an arcuate brake lining segment to an arcuate ferrous metal brake shoe by means of an interposed layer of heat hardenable organic adhesive, comprising a lower press component including a support for said brake shoe of nonconducting material and formed with a convex surface for seating the rim of said brake shoe and substantially conforming to the arc thereof, an arcuately shaped induction heating work coil element disposed within slots formed in said support and closely adjacent to the convex face thereof and adapted to induce heat in said metallic shoe, and an upper press component including a flexible endwise supported band adapted to embrace and conform to the convex face of said brake lining segment for retaining the brake lining on the outer face of the brake shoe under pressure during the heating operation.

4. A device for bonding an arcuate brake lining segment to the rim of an arcuate ferrous metal brake shoe by means of an interposed layer of heat hardenable organic adhesive, comprising a support for said brake shoe of nonconducting material and formed with a convex surface for seating said brake shoe rim and substantially conforming to the arc thereof, an arcuately shaped induction heating work coil element disposed within said support and closely adjacent to and beneath the convex face thereof and adapted to induce heat in said metallic shoe, an upper press comprising a flexible endwise supported band adapted to embrace and conform to the outer face of said brake lining segment for retaining the brake lining on the outer face of the brake shoe under a pressure substantially uniformly distributed thereover, and means for adjusting the effective length of said band.

5. A device for bonding an arcuate ferrous metal automotive brake shoe to an arcuate brake lining segment by means of an interposed layer of heat hardenable organic adhesive, comprising a support for said brake shoe of nonconducting material and formed with a convex surface for seating the rim of said brake shoe and substantially conforming to the arc thereof, said support being formed with a slot for receiving therein the rib of said brake shoe, an arcuately shaped induction heating work coil element disposed within slots formed in said support on the opposed sides of and parallel to said rib slot beneath and closely adjacent to the convex face of said support and adapted to induce heat in said metallic shoe rim, and reciprocable press means carrying thereon an endwise supported flexible resilient band adapted to embrace and retain the brake lining on the outer face of said shoe rim under a substantially uniformly distributed pressure during the heating operation.

6. A device for bonding an arcuate ferrous metal automotive brake shoe to an arcuate brake lining segment by means of an interposed layer of heat hardenable organic adhesive, comprising a support for said brake shoe of nonconducting material and formed with a convex surface for seating the rim of said brake shoe and substantially conforming to the arc thereof, said support being formed with a slot for receiving therein the rib of said brake shoe, an arcuately shaped induction heating work coil element disposed within slots formed in said support on the opposed sides of and parallel to said rib slot beneath and closely adjacent to the convex face of said support and adapted to induce heat in said metallic shoe rim, reciprocable press means carrying thereon an endwise supported flexible resilient band adapted to embrace and retain the brake lining on the outer face of said shoe rim under a substantially uniformly distributed pressure during the heating operation, and reciprocable means extending radially into said support for acting against the shoe rib and for elevating and dislodging a brake shoe from seated position.

7. A device for bonding an arcuate ferrous metal automotive brake shoe to an arcuate brake lining segment by means of an interposed layer of heat hardenable organic adhesive, comprising a support for said brake shoe of nonconducting material and formed with a convex surface for seating the rim of said brake shoe and substantially conforming to the arc thereof, said support being formed with a slot for receiving therein the rib of said brake shoe, an arcuately shaped induction heating work coil element disposed within slots formed in said support on the opposed sides of and parallel to said rib slot beneath and closely adjacent to the convex face of said support and adapted to induce heat in said metallic shoe rim, abutment means carried by and extending transversely of the face of said support for positioning the rim of the brake shoe relative to the arc of said supporting surface, separate means carried by said support and projecting above the arcuate face thereof for positioning and holding the brake lining in transverse and longitudinal alignment on the shoe rim, reciprocable press means carrying thereon an endwise supported flexible resilient band adapted to embrace and retain the brake lining on the outer face of said shoe rim under a substantially uniformly distributed pressure during the heating operation, and reciprocable means extending radially into said support for acting against the shoe rib and for elevating and dislodging a brake shoe from seated position.

GEORGE F. KINGMAN.

References Cited in the file of this patent

UNITED STATES PATENTS

| Number | Name | Date |
|---|---|---|
| 2,520,978 | Super | Sept. 5, 1950 |